United States Patent [19]

DeLorean et al.

[11] 4,026,747
[45] May 31, 1977

[54] COMPOSITE TUBING

[75] Inventors: John Z. DeLorean, Bloomfield Hills; Chauncey L. Dirks, Metamora, both of Mich.

[73] Assignee: John Z. DeLorean Corporation, Bloomfield Hills, Mich.

[22] Filed: Dec. 15, 1975

[21] Appl. No.: 640,503

Related U.S. Application Data

[62] Division of Ser. No. 545,683, Jan. 30, 1975.

[52] U.S. Cl. .............................. 156/171; 156/172; 156/187; 156/195; 428/311; 428/315
[51] Int. Cl.² ...................................... B65H 81/00
[58] Field of Search .......... 156/195, 443, 162, 161, 156/165, 169, 171–175, 425, 428, 429, 431, 191, 192, 77; 138/144; 428/36, 310, 311, 313, 315, 252

[56] References Cited

UNITED STATES PATENTS

| | | | |
|---|---|---|---|
| 2,120,426 | 6/1938 | Herrmann | 186/77 X |
| 3,194,274 | 7/1965 | Griffiths et al. | 138/144 X |
| 3,215,576 | 11/1965 | Huff | 156/162 |
| 3,562,085 | 2/1971 | Crandal et al. | 428/252 X |
| 3,651,661 | 3/1972 | Darrow | 138/144 X |
| 3,728,187 | 4/1973 | Martin | 138/144 X |
| 3,740,283 | 6/1973 | Maxey et al. | 156/162 |
| 3,775,204 | 11/1973 | Thompson | 156/192 X |
| 3,915,783 | 10/1975 | Goppel et al. | 428/313 X |

FOREIGN PATENTS OR APPLICATIONS 1,068,503   5/1967   United Kingdom

*Primary Examiner*—David A. Simmons
*Attorney, Agent, or Firm*—Reising, Ethington, Barnard, Perry & Brooks

[57] ABSTRACT

The invention relates to the fabrication of composite rigid tubular structures which include a rigidified tubular core member, an initially open-cell resilient foam material helically wrapped about the core member, a layer of reinforcing elements helically wrapped about and radially compressing said foam material, and a thermoset resinous matrix filling the compressed open-cells of said foam material and encapsulating said reinforcing elements.

2 Claims, 6 Drawing Figures

COMPOSITE TUBING

This is a division, of application Ser. No. 545,683 filed Jan. 30, 1975.

BACKGROUND OF THE INVENTION

The present invention relates to the manufacture of reinforced plastic pipe of high strength and which pipe can be fabricated in relatively continuous lengths. Rigid pipe fabricated in accordance with this invention is intended for use in transmitting high pressure liquids or gases and under conditions where metal pipes would be subjected to corrosion both by the material being transmitted and the ambient operating environment.

It is a further objective of the invention to provide a rigid pipe that is substantially lighter in weight than metal pipe of corresponding capacity for greater ease of handling and the unique construction of which permits fabrication in substantially longer lengths than heretofore known types of metal or reinforced plastic pipes.

PRIOR ART DEVICES

Reinforced high strength pipes have heretofore been made in relatively short lengths due to the method by which they are formed. Such pipe is normally made by wrapping alternate layers of resin coated high strength materials or filaments, such as fiberglass, about a mandrel and with adjacent filament layers being laid on opposite helical leads. After sufficient pipe thickness is achieved through the application of alternating layers, the pipe must be removed from the mandrel. Normally, the high strength filaments of each layer are pre-coated with thermosetting resin by passing the same through a resin bath just prior to wrapping the filaments about the mandrel. By normal practice the mandrel is rotated and the filaments applied by traversing along the length of the mandrel with the direction of travel being reversed as the filaments approach each end of the mandrel.

With the use of a rotating mandrel and criss-crossing reinforcing layers, the length of pipe sections which can be made has been limited.

PRESENT INVENTION

High strength reinforced plastic pipe made in accordance with the present invention avoids the use of a rotating mandrel and thereby enables the pipe to be made in relatively long or continuous lengths. The present invention utilizes a continuously formed rigidified tubular core member overlaid with alternate layers of thermosetting resin-impregnated open-cell foam strips and reinforcing filaments applied in such a way as to radially compress the impregnated foam to force the resin to fill the open-cell structure and to expel excess resin so as to encapsulate the reinforcing filaments. While maintaining the composite in the radially compressed condition, heat is applied to cure the resin and thereby provide an impervious hardened resin matrix extending throughout the foam and reinforcing layers. The number of alternate layers of reinforcing elements and open-cell foam utilized in fabricating pipe in accordance with the invention can be varied depending on structural strength and permeability requirements. Basic to the inventive concept is the use of a rigidified tubular core member overlaid by at least one resin impregnated open-cell foam layer and a layer of reinforcing filaments applied so as to radially compress the foam layer whereby the resin matrix is distributed throughout the various layers.

More specifically, the invention contemplates forming, as by extrusion, a continuous tubular core element formed of a plastic material such as polyvinyl chloride which has alternate layers of resin impregnated open-cell foam and reinforcing filaments alternately wrapped thereabout. The open-cell foam may be of resilient polyurethane strips wherein the cells are in open communication with each other. The reinforcing elements may be made of fiberglass either stranded or of monofilament construction. The impregnating resin is of a thermosetting variety and typically can include epoxy or polyester resins.

In order to fill substantially all the open-cells of the foam layer with the thermosetting resin and also to encapsulate the filaments with the resin, means is provided for forcing the filaments radially inwardly to compress the foam layer and to maintain said compressed condition while applying heat to harden the resin matrix.

Such radial compressing function may be achieved through the use of a sizing die means which additionally enhances the impermeability of the resin matrix, removes excess resin and controls the external smoothness of the finished pipe.

In providing a unique high strength plastic pipe design which avoids the need to use a rotatable and removable mandrel in its fabrication, it is possible to make long or substantially continuous pipe lengths at the site where the pipe is to be used and thereby greatly reducing the number of pipe couplings required and associated labor.

Referring now to the drawings.

Figure 4:
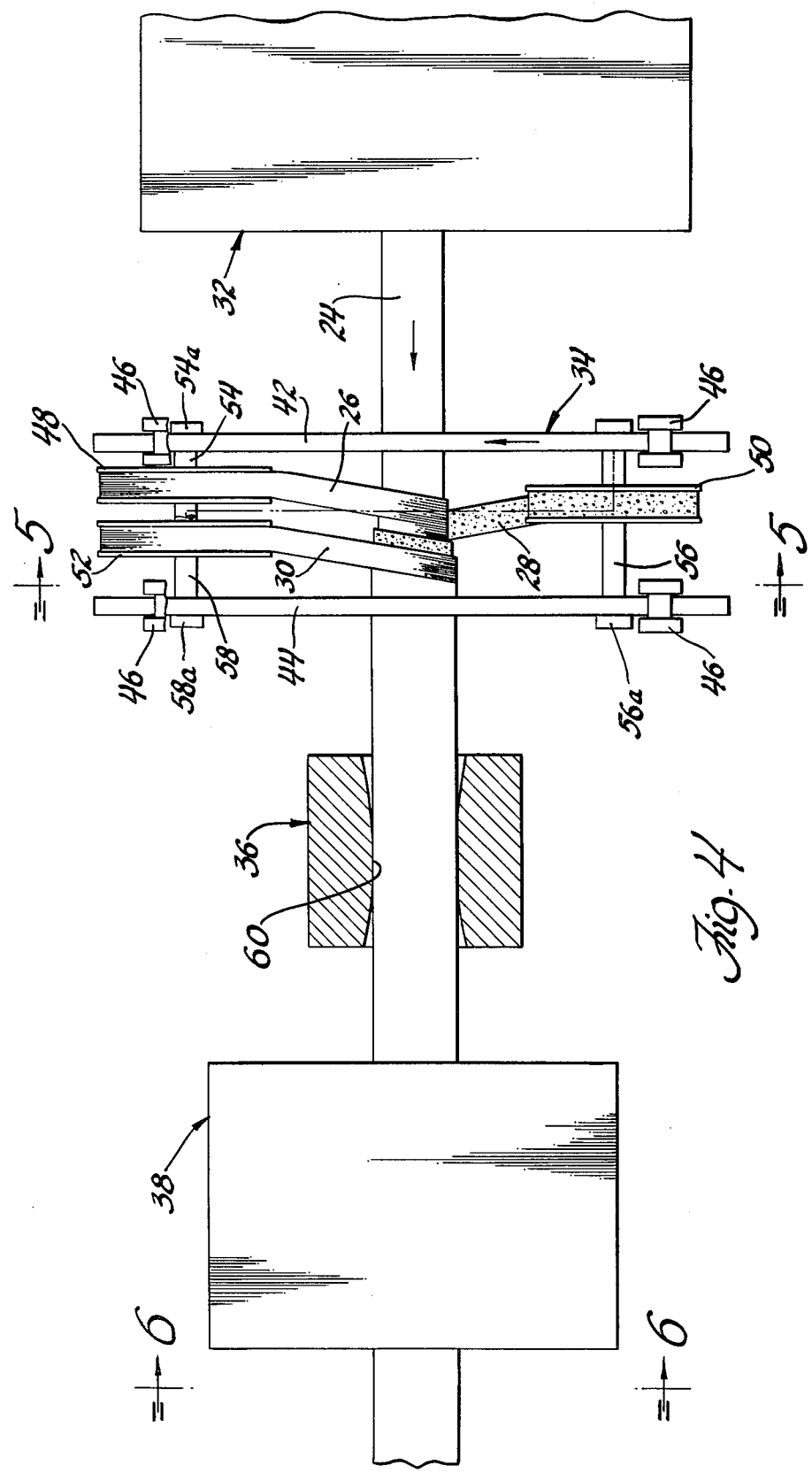
FIG. 4 shows in greater detail an illustrative apparatus for making pipe in accordance with the invention.
Figure 5:
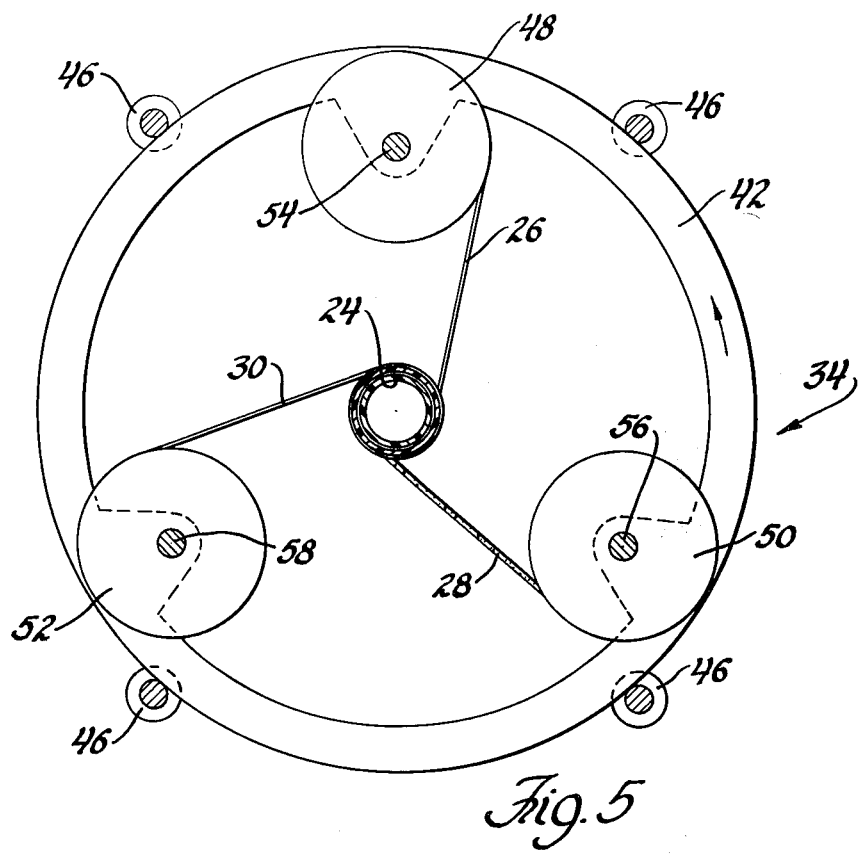
Figure 6:
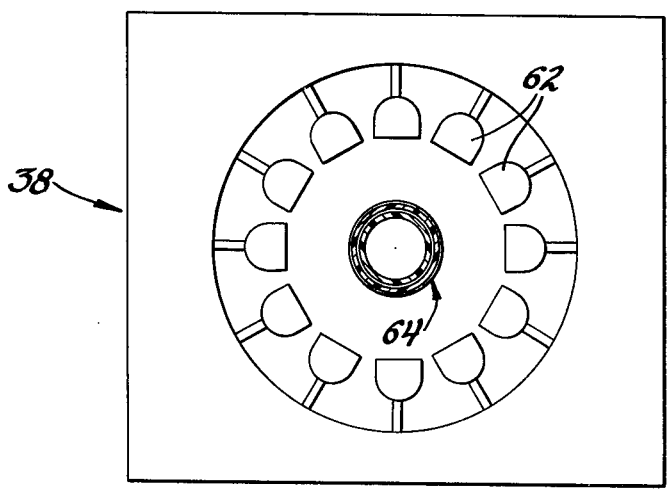

FIGS. 5 and 6 are views along lines 5—5 and 6—6 of FIG. 4.

Figure 1:
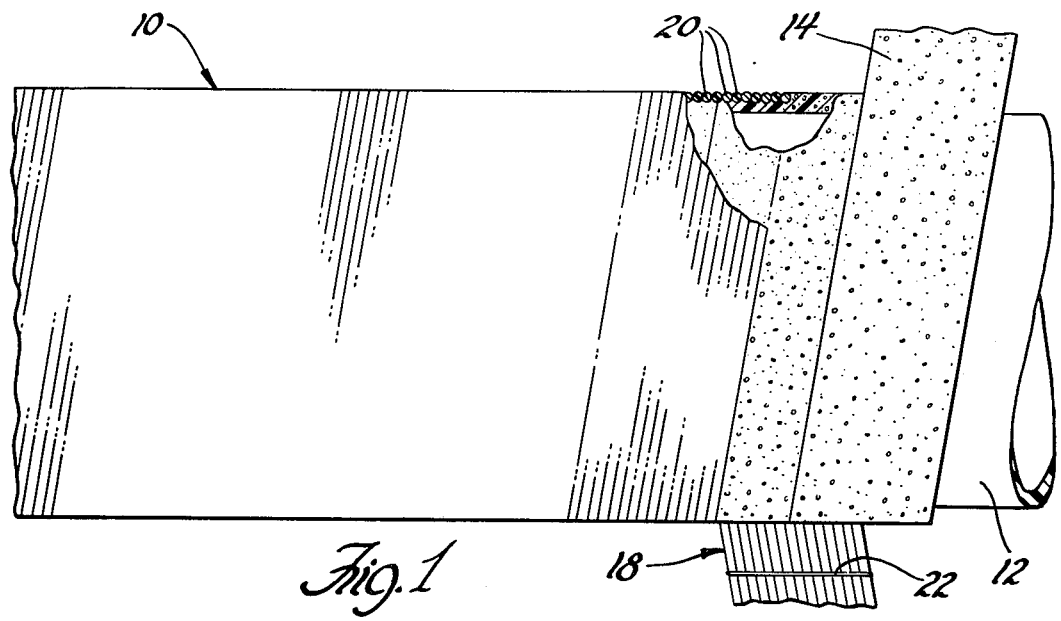
FIGS. 1 and 2 are partially sectioned views showing two modifications of reinforced pipe made in accordance with the invention.

Referring to FIG. 1, a composite reinforced plastic pipe made in accordance with the invention is indicated generally at 10. A rigidified tubular member 12 provides a core element which, while forming an integral part of the composite pipe, also provides a mandrel function about which subsequent layers of reinforcing materials are wrapped. Tubular core member 12 may be formed by any continuous process, such as extruding, from any suitable thermosetting material, such as polyvinyl chloride. It is important that core element 12 be formed with a sufficient wall thickness so as to be relatively rigid and not subject to collapsing as subsequent layers of material are wrapped thereabout. In this modification of the invention, a first layer of a resilient open-cell foam material 14, such as polyurethane, is wrapped about core element 12. Prior to mounting on a storage drum or reel such as shown in FIG. 5, the open-cell foam material 14 is partially, e.g. 50%, impregnated with a thermosetting resin material such as epoxy or polyester. To impregnate the open-cell foam material 14, an open-cell polyurethane strip is run through a suitable tank filled with the thermosetting resin and thereafter passed through doctoring rolls to squeeze out excess resin and leave the strip only partially impregnated and, therefore, relatively dry at the outer surfaces and storable on reels or drums.

As indicated at the right hand side of FIG. 1, the impregnated foam layer 14 is laid on core element 12 in an uncompressed condition and with the cells thereof in open communication with each other and partially filled with the thermosetting resin. A layer of reinforcing fiberglass filaments is indicated generally at 18. Depending on the ultimate strength required for the composite pipe, the reinforcing layer may be either of a woven cloth configuration, a mat swirl or unidirectional filaments 20 as shown in FIG. 1. The unidirectional filaments are preferred in that they provide greater hoop strength to the finished pipe. The unidirectional fiberglass filaments 20 can be provided in strip form as shown in the drawings and wherein the filaments are lightly held together by suitable cross thread elements 22 spaced along the length of the strip.

Figure 2:
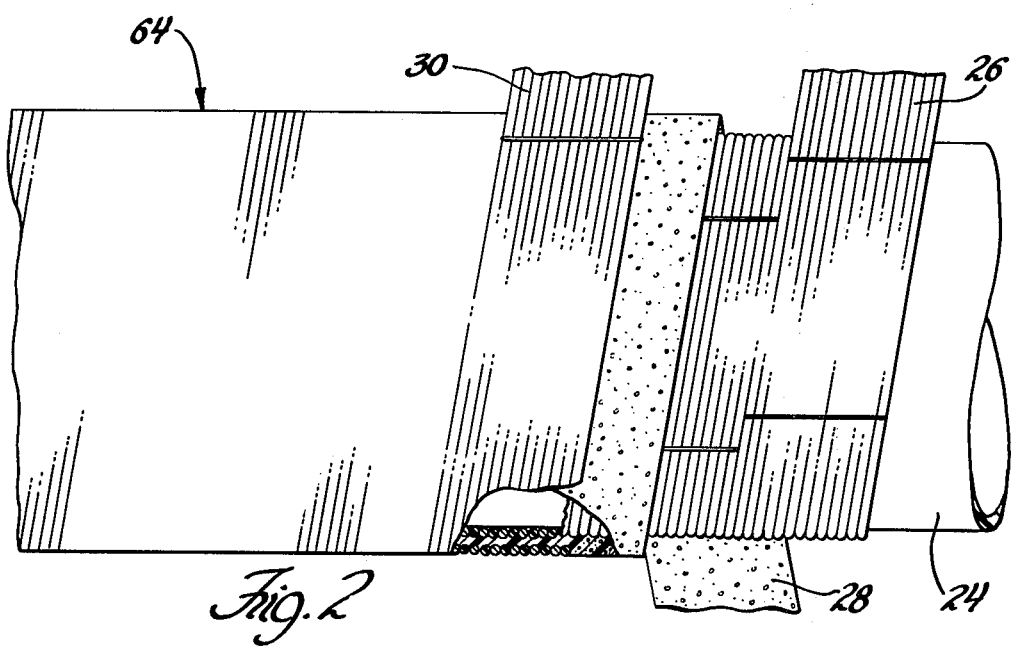

Filament strip 20 is mounted on a suitable reel which is, in turn, maintained under a tension load whereby in being wrapped about the impregnated foam layer 14, filament strip 20 is moved radially inwardly against the resilient foam layer so as to compress the latter to approximately one-half of its original thickness. In thus compressing the foam layer 14, the resin contained therewithin is extruded throughout the open-cell foam structure so as to fill substantially all of the now compressed cells with the thermosetting resin and with the excess of said resin being expelled radially outwardly through the reinforcing layer so as to encapsulate the individual filaments in said resin. Thus, the thermosetting resin is squeezed to provide a matrix extending throughout the foam and filament layers.

Where a higher strength composite pipe is required, additional layers of reinforcing elements may be utilized, as shown in FIG. 2. In this case, the rigidified plastic core element 24 is wrapped with a first strip of reinforcing elements 26 which is overlaid with a layer of resin impregnated resilient foam 28 which, in turn, is wrapped with a second strip of reinforcing elements 30. Once again, the reinforcing strip 30 is maintained under sufficient tension or drag to substantially reduce the thickness of foam layer 28 thereby filling substantially all the open-cells thereof and to expelling excess resin so as to encapsulate layers 26 and 30 therein.

In both of the modifications of FIGS. 1 and 2, additional means may be provided, infra, to create an additional radial compressive force on the various pipe layers to insure that all the foam cells are filled and reinforcing elements encapsulated prior to heat curing the resin.

The process and an illustrative apparatus for forming the composite pipe will now be described.

Figure 3:
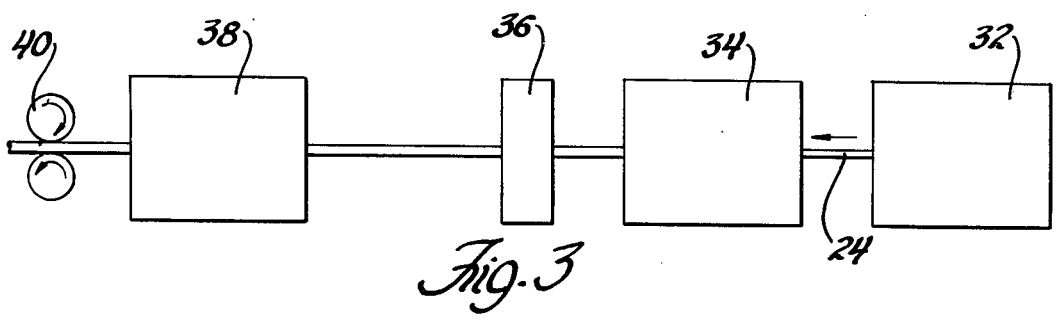
FIG. 3 is a block diagram showing the various steps in the method of making pipe in accordance with the invention.

FIG. 3 is a diagrammatic representation of an apparatus for forming the composite pipe in accordance with the invention and specifically the modification of FIG. 2. The details of the various devices included in the apparatus of FIG. 3 are shown in FIGS. 4 through 6.

Referring first to FIG. 3, the in line apparatus includes an extruder 32 for continuously forming the rigidified tubular core element 24, a wrapping device 34 for applying reinforcing filament layers 26 and 30 as well as an intermediate resilient open-cell foam layer 28. After leaving the wrapping device 34 the wrapped core element passes through a sizing die 36 prior to entering a heating device 38 wherein the thermosetting resin is hardened. The composite pipe is drawn through the aforementioned apparatus by a suitable driving mechanism 40. The various devices constituting the composite pipe forming apparatus will now be described in greater detail and by reference to FIGS. 4 through 6.

Referring first to FIG. 6, it should first be noted that the various devices making up the pipe forming apparatus are disposed in line to facilitate the forming of a straight length of composite pipe and can be mounted on a common bed or platform, not shown, so that the apparatus may be moved as a single entity facilitating its movement from site to site.

Extruder 32 is of a conventional screw or helix type whereby tubing may be extruded in a continuous length therefrom. Inasmuch as it is necessary that tubular core elements 12 or 24 be rigid prior to entering the wrapping device 34, extruder 32 would probably also include a suitable chilling or cooling device not specifically shown.

As the rigidified tubular core element 24 leaves the extruding station, it next passes through the wrapping device 34. In describing wrapping device 34 particular reference should be made to FIGS. 4 and 5. Wrapping device 34 includes a pair of axially spaced disc members 42 and 44 suitably interconnected for rotation on supporting rollers 46. Discs 42 and 44 are concentrically disposed relative to the axis of tubular core element 24. One or more of the supporting rollers 46 is connected to a drive mechanism, not shown, whereby the discs may be rotated relative to the tubular core element 24. Incidentally, the speed of rotation of discs 42–44 is coordinated with that of pipe driving mechanism 40 to regulate the manner in which the various helical layers are applied to core element 24. Wrapping device 34 includes a plurality of storage reels 48, 50 and 52 respectively mounted on shafts 54, 56 and 58 and which are, in turn, rotatably supported between the disc members 42 and 44. While shown as being substantially parallel to the axis of tubular core element 24, the axes of shafts 54, 56 and 58 may be slightly inclined to the core element axis if necessary to facilitate wrapping layers 26, 28 and 30 upon the core element.

Reel 48, which is axially disposed closest to extruder 32, contains a first supply of unidirectional reinforcing filaments 26. Reel 50 contains a supply of the partially resin-impregnated resilient open-cell foam strip 28 and is disposed axially intermediate reels 48 and 52. Reel 52 contains the second supply of unidirectional reinforcing filament strip 30. By reference to FIG. 5, it will be noted that reels 48, 50 and 52 are circumferentially spaced at approximately 120° from each other. For ease of illustrating the laying of strips 26, 28 and 30 about core element 24, the reels 48, 50 and 52, as shown in FIG. 4, have been circumferentially displaced from their actual and symmetrical positions on discs 42 and 44, as properly shown in FIG. 5.

Each of the reel shafts 54, 56 and 58 includes a breaking device 54a, 56a and 58a to create a drag or tension load to adjustably control the tightness with which each of the various layers is laid down upon tubular core element 24. Thus, as discs 42–44 are rotated relative to the axially moving tubular core element 24, layer 26 of reinforcing elements is wrapped about the core element and is, in turn, overlaid with resin impregnated foam layer 28 which is then overlaid by the second layer of reinforcing elements 30.

The drag or frictional load on reel 52 is suitably adjusted to insure that the outer layer of reinforcing elements 30 is drawn radially down against the subadjacent foam layer 28 to compress the same to approximately one-half of its original thickness, as best seen in the cut-away section of FIG. 2.

The strength and impermeability of the resultant composite pipe is importantly effected by the distribution of the hardened resin matrix throughout the various layers overlaid on the tubular core element 24. Accordingly, sizing or compressing die 36 is provided. Die 36 is concentrically disposed about tubular core element 24 and includes an inner bore 60 of such a size as to insure that outer reinforcing layer 30 suitably compresses foam layer 28 to extrude the thermosetting resin matrix throughout the layers as described. The sizing die performs the additional functions of removing excess resin, which can be suitably collected, and smoothing the exterior pipe surface.

Following passage through the compressing or sizing die 36, the wrapped pipe now passes through heating device 38 where the resin is hardened. Referring more specifically to FIG. 6, heating device 38 may be comprised of any suitable heat source such as infra red lamps 62 circumferentially disposed about the composite pipe 64.

It is to be understood that various modifications may be made to the structures, apparatus and process within the intended scope of the invention as set forth in the hereinafter appended claims.

The embodiments of the present invention in which an exclusive property or privilege is claimed are defined as follows:

1. The method of making a composite tubular structure comprising longitudinally moving a rigidified continuous tubular core member, impregnating a strip of open-cell resilient foam material with a thermosetting resinous material, wrapping said impregnated foam strip about said core member, wrapping a layer of reinforcing elements about said foam material, urging said reinforcing elements radially inwardly to compress said foam material thereby causing said resinous material to fill the cells of said materials and to expel excess resinous material therefrom to encapsulate said reinforcing elements in said resinous material, and applying heat to hardened said resinous material while maintaining said foam in a compressed condition.

2. The method of making a composite tubular structure comprising longitudinally moving a rigidified continuous tubular core member, impregnating a strip of open-cell resilient foam material with a thermosetting resinous material, wrapping said impregnated foam strip about said core member, wrapping a layer of reinforcing elements about said foam material, urging said reinforcing elements radially inwardly to compress said foam material thereby causing said resinous material to fill the cells of said material and to expel excess resinous material therefrom to encapsulate said reinforcing elements in said resinous material, circumferentially compressing and wiping the wrapped and encapsulated reinforcing elements to remove excess resinous material, and applying heat to harden said resinous material while maintaining said foam in a compressed condition.

* * * * *